United States Patent
Lewis et al.

(10) Patent No.: US 10,336,257 B2
(45) Date of Patent: Jul. 2, 2019

(54) REAR VISION SYSTEM FOR A VEHICLE AND METHOD OF USING THE SAME

(71) Applicant: GM GLOBAL TECHNOLOGY OPERATIONS LLC, Detroit, MI (US)

(72) Inventors: Allan K. Lewis, Windsor (CA); Mohammad Naserian, Windsor (CA); Michael T. Chaney, Jr., Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 419 days.

(21) Appl. No.: 15/078,069

(22) Filed: Mar. 23, 2016

(65) Prior Publication Data

US 2017/0274827 A1    Sep. 28, 2017

(51) Int. Cl.

| | |
|---|---|
| *B60R 1/08* | (2006.01) |
| *B60R 1/12* | (2006.01) |
| *G07C 5/00* | (2006.01) |
| *G08G 1/01* | (2006.01) |
| *H04N 5/445* | (2011.01) |
| *H04N 7/18* | (2006.01) |

(Continued)

(52) U.S. Cl.
CPC .................. *B60R 1/12* (2013.01); *B60R 1/00* (2013.01); *B60R 1/08* (2013.01); *G07C 5/008* (2013.01); *G08G 1/0112* (2013.01); *G08G 1/096716* (2013.01); *G08G 1/096791* (2013.01); *G08G 1/163* (2013.01); *G08G 1/167* (2013.01); *H04N 5/23206* (2013.01); *H04N 5/23293* (2013.01); *H04N 5/247* (2013.01); *H04N 7/183* (2013.01); *B60R 2001/1253* (2013.01); *B60R 2300/301* (2013.01); *B60R 2300/302* (2013.01); *B60R 2300/305* (2013.01); *B60R 2300/8066* (2013.01); *G06T 2207/10016* (2013.01); *H04N 5/445* (2013.01)

(58) Field of Classification Search
CPC ..... B60R 1/08; B60R 1/12; B60R 2001/1253; B60R 2300/8066; G06T 2207/10016; G07C 5/008; G08G 1/0112; H04N 5/445; H04N 7/183
USPC .......................................................... 348/149
See application file for complete search history.

(56) References Cited

U.S. PATENT DOCUMENTS

| | | | | |
|---|---|---|---|---|
| 9,623,876 B1 * | 4/2017 | Slusar | ................... | B60W 40/09 |
| 2009/0231158 A1 * | 9/2009 | Grigsby | ............... | G08G 1/0962 |
| | | | | 340/902 |

(Continued)

*Primary Examiner* — Deirdre L Beasley
(74) *Attorney, Agent, or Firm* — Reising Ethington, P.C.

(57) ABSTRACT

A rear vision system for a host vehicle and a method of using the same, where the rear vision system includes an electronic display mirror that is designed to replace a traditional rearview mirror. The electronic display mirror has an integrated electronic video display that is coupled to a rearward facing camera at the back of the vehicle and displays a video feed from the camera to the driver in real time. The electronic display mirror can display enhanced video output that shows the area behind the host vehicle, along with performance metrics that are superimposed on the video and provide relevant information to the driver. For example, the enhanced video output may include an estimated time difference between the host vehicle and the closest trailing vehicle superimposed on the video; this may be particularly useful when the host vehicle is involved in a performance driving event, like a race.

15 Claims, 6 Drawing Sheets

(51) Int. Cl.
*B60R 1/00* (2006.01)
*G08G 1/16* (2006.01)
*H04N 5/232* (2006.01)
*H04N 5/247* (2006.01)
*G08G 1/0967* (2006.01)

(56) References Cited

U.S. PATENT DOCUMENTS

| | | | | |
|---|---|---|---|---|
| 2010/0131197 | A1* | 5/2010 | Zhang | G01C 21/36 |
| | | | | 701/533 |
| 2012/0062743 | A1* | 3/2012 | Lynam | B60Q 9/005 |
| | | | | 348/148 |
| 2012/0068860 | A1* | 3/2012 | Popovic | G08G 1/09626 |
| | | | | 340/905 |
| 2012/0154591 | A1* | 6/2012 | Baur | B60R 1/00 |
| | | | | 348/148 |
| 2013/0127638 | A1* | 5/2013 | Harrison | G08G 1/166 |
| | | | | 340/903 |
| 2013/0286206 | A1* | 10/2013 | Ozaki | H04N 7/18 |
| | | | | 348/148 |
| 2013/0304279 | A1* | 11/2013 | Mudalige | G08G 1/164 |
| | | | | 701/2 |
| 2016/0119419 | A1* | 4/2016 | Choi | B60K 35/00 |
| | | | | 701/36 |
| 2016/0200249 | A1* | 7/2016 | Boyd | B60Q 9/00 |
| | | | | 340/459 |
| 2017/0178498 | A1* | 6/2017 | Mcerlean | B60K 35/00 |
| 2017/0268896 | A1* | 9/2017 | Bai | G01C 21/3484 |

* cited by examiner

REAR VISION SYSTEM FOR A VEHICLE AND METHOD OF USING THE SAME

FIELD

The present invention generally relates to a rear vision system for a vehicle and, more particularly, to a rear vision system that replaces a traditional rear view mirror with an electronic display mirror.

BACKGROUND

Traditional rear view mirrors have been used in vehicles for a long time and, in recent years, they have been adapted to include a variety of electronic features such as auto-dimming features, built-in compasses, and integrated display screens, to cite a few examples. One of the newer developments involves the replacement of the traditional rear view mirror with an electronic display mirror that, instead of a standard mirrored surface, has an integrated electronic video display that is coupled to a rearward facing camera at the back of the vehicle and displays a video feed from the camera to the driver.

There are a number of reasons why an electronic display mirror may be preferable over a standard rear view mirror in certain vehicles. For example, current design trends tend to favor vehicles with beltlines and rooflines that result in small rear windows, and vehicle infotainment systems with drop-down screens can block or otherwise obstruct a driver's view with a traditional rear view mirror. These, as well as other factors, can make it desirable to replace a standard rear view mirror with an electronic display mirror for certain vehicle applications.

One potential drawback of an electronic display mirror, however, may occur when the vehicle is being driven on a roadway with a number of sharp turns and/or elevation changes, such as a racetrack. On this type of roadway, there could be a nearby vehicle that is outside of the field-of-view of the rearward facing camera and, therefore, is not seen on the electronic display mirror by the driver. Even when a nearby vehicle is shown on the electronic display mirror, the driver may wish to see certain metrics pertaining to that vehicle (e.g., relative distance or time between the host vehicle and the trailing vehicle); this tends to be particularly true during performance driving events, like when the vehicle is being driven on a racetrack. The system and method described herein address this scenario.

SUMMARY

According to one embodiment, there is provided a method for use with a rear vision system for a host vehicle, the rear vision system having a rear facing camera, a vehicle-to-vehicle (V2V) unit, and an electronic display mirror. The method comprising the steps of: obtaining video input from the rear facing camera; obtaining traffic input from the V2V unit, the traffic input pertains to a remote vehicle; using the traffic input to determine a performance metric for the remote vehicle; and displaying an enhanced video output on the electronic display mirror, wherein the enhanced video output includes the performance metric superimposed on the video input.

According to another embodiment, there is provided a rear vision system for use with a host vehicle, comprising: a rear vision system control unit; a rear facing camera that is coupled to the control unit and provides the control unit with video input of an area behind the host vehicle; a vehicle-to-vehicle (V2V) unit that is coupled to the control unit and provides the control unit with traffic input relating to one or more remote vehicles; and an electronic display mirror that is coupled to the control unit and receives enhanced video output from the control unit. The control unit is configured to manipulate the video input by adding a performance metric for a remote vehicle, and the performance metric for the remote vehicle is at least partially based on the traffic input from the V2V unit.

DRAWINGS

Preferred exemplary embodiments will hereinafter be described in conjunction with the appended drawings, wherein like designations denote like elements, and wherein.

DESCRIPTION

There is disclosed herein a rear vision system for a host vehicle and a method of using the same, where the rear vision system includes an electronic display mirror that is designed to replace a traditional rearview mirror. An electronic display mirror looks much like a traditional rear view mirror, except that instead of a standard mirrored surface, it has an integrated electronic video display that is coupled to a rearward facing camera at the back of the vehicle and displays a video feed from the camera to the driver in real time. As mentioned above, there may be situations where a driver is interested in certain information or performance metrics pertaining to a trailing vehicle (e.g., relative distance, relative time, etc.). This may be particularly true during performance driving events, like when a host vehicle is being driven on a racetrack with other nearby vehicles, including trailing vehicles. A "trailing vehicle," as used herein, broadly includes any remote vehicle whose front-most point is located behind the host vehicle's front-most point, relative to the direction of host vehicle travel.

According to one potential method, a rear facing camera mounted on the host vehicle provides video input of an area located behind the host vehicle, a vehicle-to-vehicle (V2V) unit provides traffic input pertaining to a trailing vehicle, a rear vision system control unit uses the traffic input to calculate a performance metric for the trailing vehicle (e.g., relative distance, relative time), and an electronic display mirror displays enhanced video output, wherein the enhanced video output includes the performance metric superimposed on the video so that the driver can see it in real time. The preceding method may further include steps to prepare for an upcoming performance driving event, such as a race, where the steps include receiving notice of an upcoming race, obtaining information pertaining to the track or course on which the upcoming race will take place, receiving information from one or more remote vehicles, and filtering out remote vehicles that are not participating in the upcoming race. Other embodiments and features are certainly possible.

Figure 1:
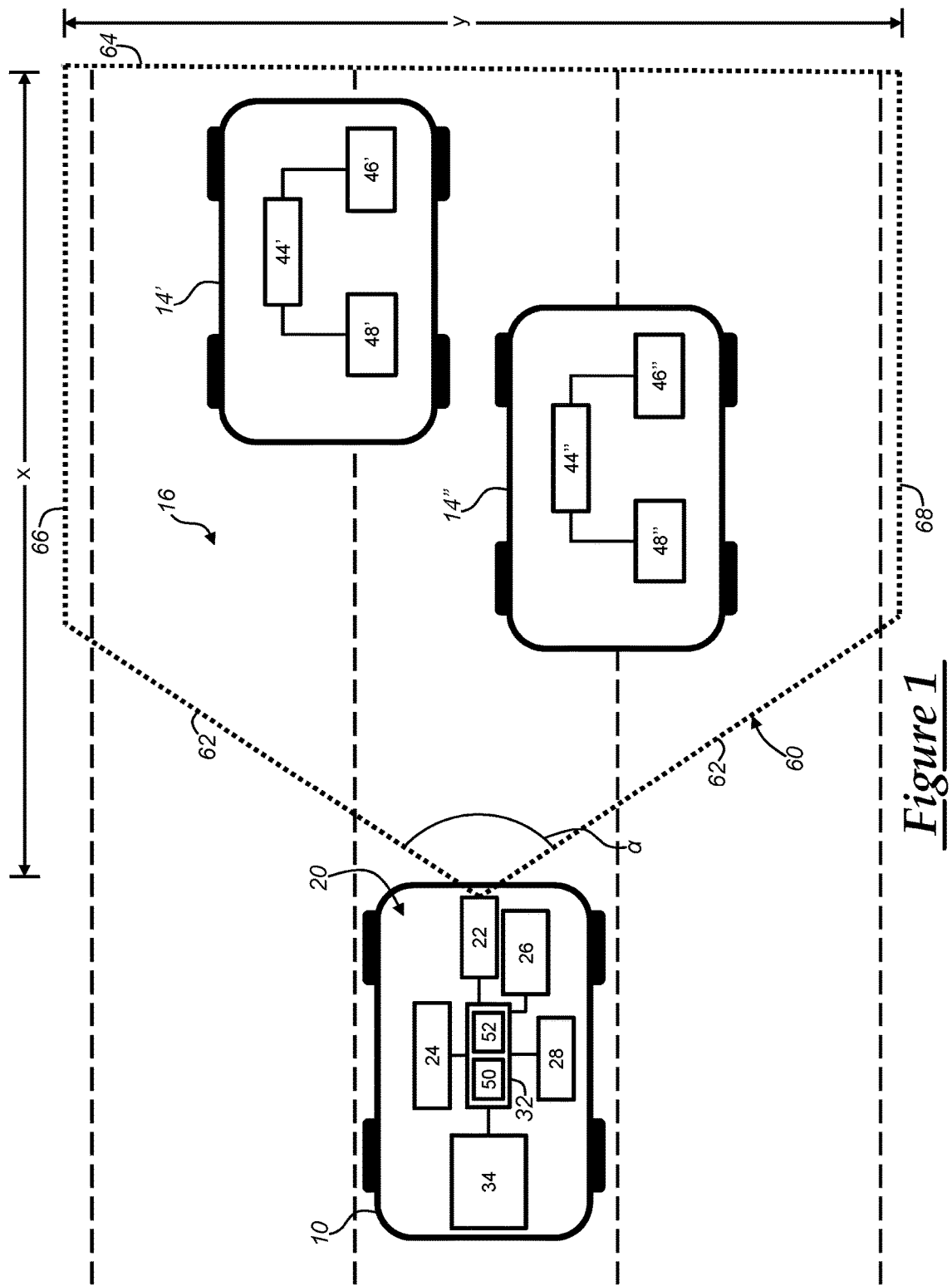
FIG. 1 is a schematic diagram of a host vehicle with an exemplary rear vision system and two trailing vehicles that are both within the field-of-view of a rear facing camera.

Turning now to FIG. 1, there is shown a schematic illustration of a host vehicle 10, where the host vehicle is equipped with an exemplary rear vision system 20 that includes a camera 22, a vehicle-to-vehicle (V2V) unit 24, vehicle dynamics sensors 26, a navigation unit 28, a rear vision system control unit 32, and an electronic display mirror 34. As seen, remote vehicles 14', 14" (collectively referred to as vehicles 14) are traveling behind the host vehicle 10 and are within the field-of-view 60 of camera 22. The remote vehicles 14 are also equipped with a vehicle-to-vehicle unit 44, a variety of different sensors 46, and a navigation unit 48. As will be explained in the following paragraphs, the host vehicle 10 and the remote vehicles 14 may be part of a vehicle-to-vehicle (V2V) communication system 16 that enables nearby vehicles to communicate with one another and, in this particular case, for the remote vehicles 14 to provide data regarding their position, speed, heading and/or other parameters to the host vehicle 10 so that this information can be conveyed to the driver via the electronic display mirror 34.

Camera 22 is a rearward facing camera that is directed to an area behind the host vehicle 10 and provides the rear vision system 20 with video input to be displayed on the electronic display mirror 34. Camera 22, also referred to as a reversing camera or a rear view camera, may be of any suitable camera type (e.g., charge coupled device (CCD), complementary metal oxide semiconductor (CMOS), etc.) and may have any suitable lens known in the art so that it is not limited to any particular type, brand or model. According to one possibility, camera 22 provides video data where the images are horizontally flipped (i.e., they are the mirror image of the video originally captured by the camera). The horizontally flipped video data accounts for the fact that camera 22 and the driver are facing opposite directions thereby allowing presentation of the video data on the electronic display mirror 34 in an orientation that is consistent with a traditional rear view mirror. Some non-limiting examples of potential embodiments or features that may be used with camera 22 include: infrared LEDs for night vision; wide angle or fish eye lenses; surface mount, flush mount, license mount, or side mount cameras; stereoscopic arrangements with multiple cameras; cameras integrated into tail lights, brake lights, or other components at the rear end of the vehicle; and wired or wireless cameras, to cite a few possibilities.

Vehicle-to-vehicle (V2V) unit 24 is a wireless communication device that enables host vehicle 10 to communicate with one or more similarly equipped and nearby vehicles according to the V2V communication system 16. The V2V unit 24, also referred to, in some embodiments, as a V2V radio or V2V module, provides rear vision system 20 with traffic input that may include information pertaining to nearby vehicles, such as remote vehicles 14. This information may also be used by different systems within the host vehicle 10, like autonomous and semi-autonomous driving systems, vehicle safety systems, vehicle warning systems, etc. According to one embodiment, the V2V unit 24 includes a suitable combination of hardware, software and/or applications configured to communicate with other vehicles over a short-range wireless network (e.g., dedicated short-range communications (DSRC) operating at a frequency of about 5.850-5.925 GHz and with a range of up to about 1,000 m). The V2V unit 24 may send and/or receive messages referred to as basic service messages (BSMs) according to a mesh network architecture, where every node (i.e., vehicle, smart traffic signal, etc.) can send, receive and/or retransmit messages. Skilled artisans will appreciate that V2V unit 24 may include any suitable combination of components and devices needed to carry out the method described herein, including a connected device like on-board equipment (OBE), an on-board unit (OBU), an aftermarket safety device (ASD), and/or a vehicle awareness device (VAD), to cite a few examples.

The basic safety message (BSM) is a standard message type and is designed to inform nearby vehicles of the position, dynamics and/or status of the transmitting vehicle. The BSM generally includes a Part I or core data set that is sent every 100 milliseconds or so, and a Part II or secondary data set that is optional and is sent less frequently. The Part I or core data set usually includes the following information: vehicle size, vehicle position (e.g., GPS coordinates), vehicle speed, vehicle direction of travel or heading, vehicle acceleration, brake system status, and time; whereas the Part II or secondary data set can vary and may indicate that the vehicle is braking hard or that ABS is activated, for example. More information regarding the BSM standard can be found in SAE J2735 BSM. It should be appreciated that while the exemplary system and method described below utilize the V2V communication system 16 to exchange BSMs between vehicles, this is not the only possibility. Any other suitable system, standard, protocol, etc. for automatically exchanging information and data between vehicles over an inter-vehicle wireless communication network could be used, and the system and method described herein are not limited to the aforementioned SAE standard or the examples below.

Vehicle dynamic sensors 26 provide the rear vision system 20 with sensor input that includes various sensor readings, measurements, and/or other information that may be useful for carrying out the present method. For example, vehicle dynamic sensors 26 may include sensors or other components for measuring: wheel speed, wheel acceleration, vehicle speed, vehicle acceleration (longitudinal and/or lateral acceleration), yaw rate, steering wheel angle, other vehicle dynamics, as well as other sensors known in the art but not mentioned here. Sensors 26 can utilize a variety of different sensor types and techniques, including those that use rotational wheel speed, ground speed, an accelerometer, an inertial measurement unit (IMU), accelerator pedal position, gear shifter selection, engine speed, engine output, throttle valve position, steering wheel angle, to name a few. Skilled artisans will appreciate that these sensors may operate according to optical, electromagnetic, and/or other technologies, and that other parameters may be derived or calculated from these readings (e.g., acceleration may be calculated from velocity). Sensors 26 may be embodied in hardware, software, firmware, or some combination thereof, and these sensors may directly sense or measure the conditions for which they are provided, or they may indirectly evaluate such conditions based on information provided by other sensors, components, devices, modules, systems, etc. It is possible for any of the various sensor readings described below to be provided by some other component, device, module, system, etc. in host vehicle 10 instead of being provided by an actual sensor element. It should be appreciated that the foregoing scenarios represent only some of the possibilities, as the present system and method are not limited to any particular sensor or sensor arrangement.

Navigation unit 28 provides the rear vision system 20 with navigation input that includes the location or heading of the host vehicle 10, road information, or a combination thereof. Depending on the particular embodiment, the navigation unit 28 may be a stand-alone component or it may be integrated within some other component or system within the vehicle. The navigation unit may include any combination of other components, devices, modules, etc., like a GPS unit, and may use the current position of the vehicle and road- or map-data to evaluate the upcoming road. For instance, the navigation signals or readings from unit 28 may include the current location of the vehicle and information regarding the configuration of the current road segment and the upcoming road segment (e.g., information on turns, curves, forks, embankments, straightaways, etc.). The navigation unit 28 can store pre-loaded map data and the like, or it can wirelessly receive such information through a telematics unit or some other communications device, to cite two possibilities.

Rear vision system control unit 32 acts as the main controller or control module of the rear vision system 20 and is at least partially responsible for performing or carrying out one or more of the methods described below. According to an exemplary embodiment, the control unit 32 is coupled to camera 22 and receives video input, is coupled to V2V unit 24 and receives traffic input, is coupled to vehicle dynamic sensors 26 and receives sensor input, is coupled to navigation unit 28 and receives navigation input, and is coupled to electronic display mirror 34 and provides enhanced video output, although other combinations of devices may be coupled to the control unit instead. Control unit 32 may include any variety of electronic processing devices, memory devices, input/output (I/O) devices, and/or other known components, and may perform various control and/or communication related functions.

In an exemplary embodiment, control unit 32 includes an electronic memory device 50 that may receive and store any combination of the following items: video data from camera 22, information pertaining to nearby vehicles from V2V unit 24, sensor readings from vehicle dynamic sensors 26, position or heading data from navigation unit 28, look up tables or other data structures, algorithms (e.g., algorithms embodied in the exemplary method described below), etc. Memory device 50 may also store pertinent characteristics and background information pertaining to the host vehicle 10, such as information relating to vehicle dimensions (e.g., weight, width and length), stopping distances, driver behavioral or historical data, particular sensor or camera locations and orientations on host vehicle 10, etc. Control unit 32 may also include an electronic processing device 52 (e.g., a microprocessor, a microcontroller, an application specific integrated circuit (ASIC), etc.) that executes instructions for software, firmware, programs, algorithms, scripts, applications, etc. that are stored in memory device 50 and may govern the methods described herein. Control unit 32 may be electronically connected to other vehicle devices, modules, and systems via suitable vehicle communications (e.g., a CAN bus or the like) and can interact with them when required. These are, of course, only some of the possible arrangements, functions and capabilities of control unit 32, as other embodiments could also be used.

Electronic display mirror 34 includes a video display integrated into the rear view mirror unit or housing so that the display shows the driver the video output from the rear view camera 22 in real time. According to the exemplary embodiment of FIG. 1, the electronic display mirror 34 is coupled to and receives enhanced video output from control unit 32. The electronic display mirror may utilize any number of different display technologies, such as a liquid crystal display (LCD) or a light emitting diode (LED) display. It should be appreciated that the system and method described herein may use any suitable type of electronic display mirror 34 and are not limited to any particular one. For instance, the electronic display mirror 34 may be a full display mirror (FDM) where the entire viewable surface of the device shows video from camera 22; it may be the type of electronic display mirror where only a portion of the display surface shows video from camera 22, whereas other portions of the display surface show other information (e.g., turn-by-turn or other navigation instructions, a compass or heading information, host vehicle performance data, etc.); it could have daytime and nighttime modes that adjust the brightness accordingly; or it could have a touchscreen so that users can make selections or otherwise input data, to cite a few of the possibilities. Instead of the electronic display mirror 34 being positioned in the traditional location of a rear view mirror (i.e., mounted to the front windshield at an upper, center location), it is possible for it to be part of a center consul infotainment or rear backup display or for it to be part of some other display.

Any of the devices 22-34 may be stand-alone, as illustrated in FIG. 1, or they may be incorporated or included within some other device, unit or module (e.g., the V2V unit 24 could be included within another vehicle communication module, some of the sensors 26 could be packaged in an inertial measurement unit (IMU), the navigation unit 28 could be part of a telematics unit, the control unit 32 could be integrated with the electronic display mirror 34 or an instrument cluster control module, etc.). Furthermore, any of the devices 22-34 may be dedicated, as depicted in FIG. 1, or they may be part of or shared by other systems or sub-systems in the vehicle (e.g., camera 22 and/or some of the sensors 26 could be part of an active safety system, an antilock brake system (ABS), or an autonomous or semi-autonomous driving system; the electronic display mirror 34 or the control unit 32 could be part of a vehicle infotainment system, etc.). The video input, traffic input, sensor input and/or navigation input from devices 22-28 may be directly provided to control unit 32 or indirectly provided through some other device, module and/or system, as is commonly known in the art. Similarly, the enhanced video output from control unit 32 may be directly or indirectly provided to the electronic display mirror 34. Accordingly, the devices 22-34 are not limited to the schematic representation in FIG. 1 or the exemplary descriptions above, nor are they limited to any particular embodiment or arrangement so long as they can be used with the method described herein.

Figure 2:
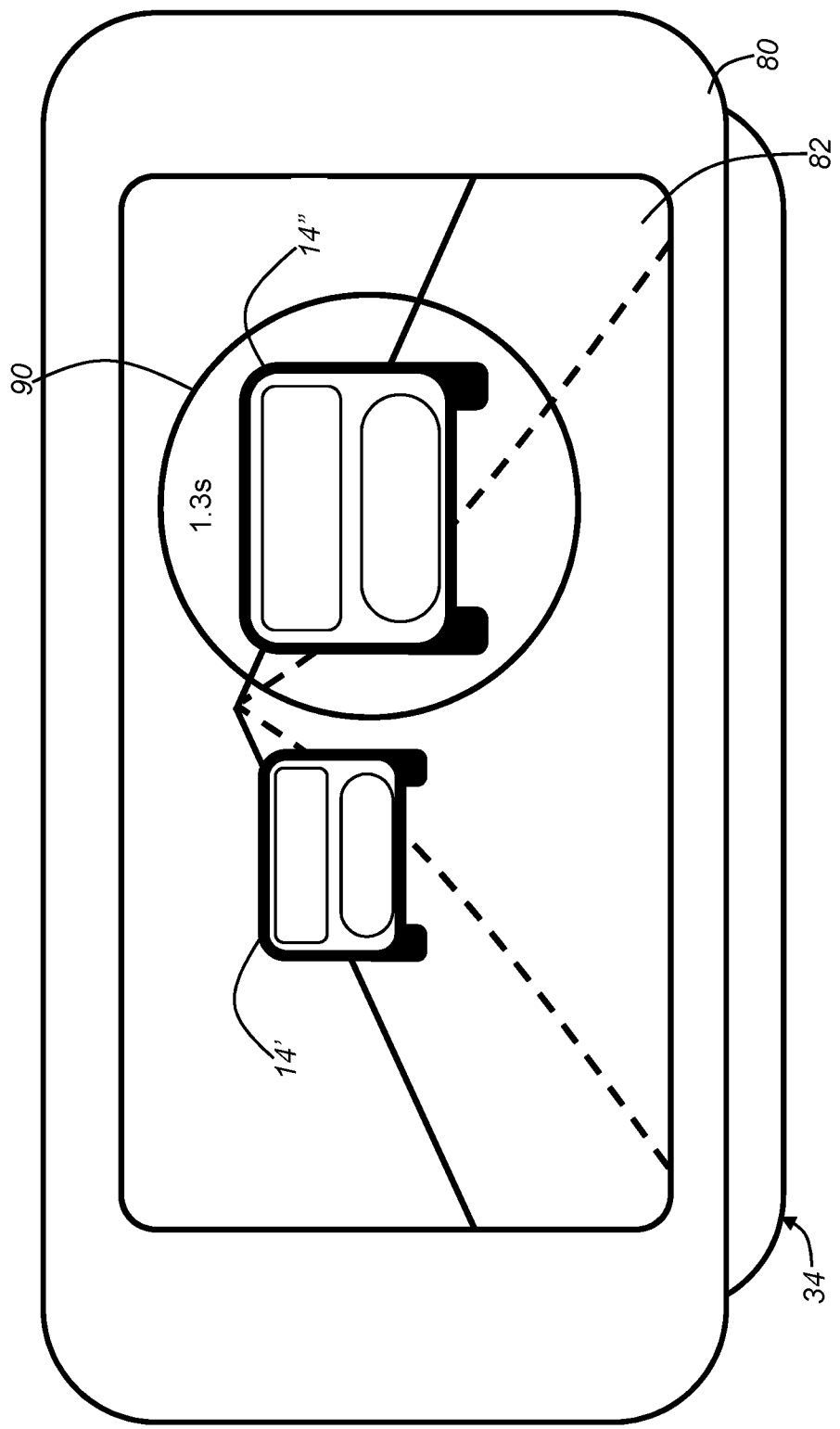
FIG. 2 is a schematic illustration of an exemplary electronic display mirror that may be used with the rear vision system of FIG. 1.
Figure 3:
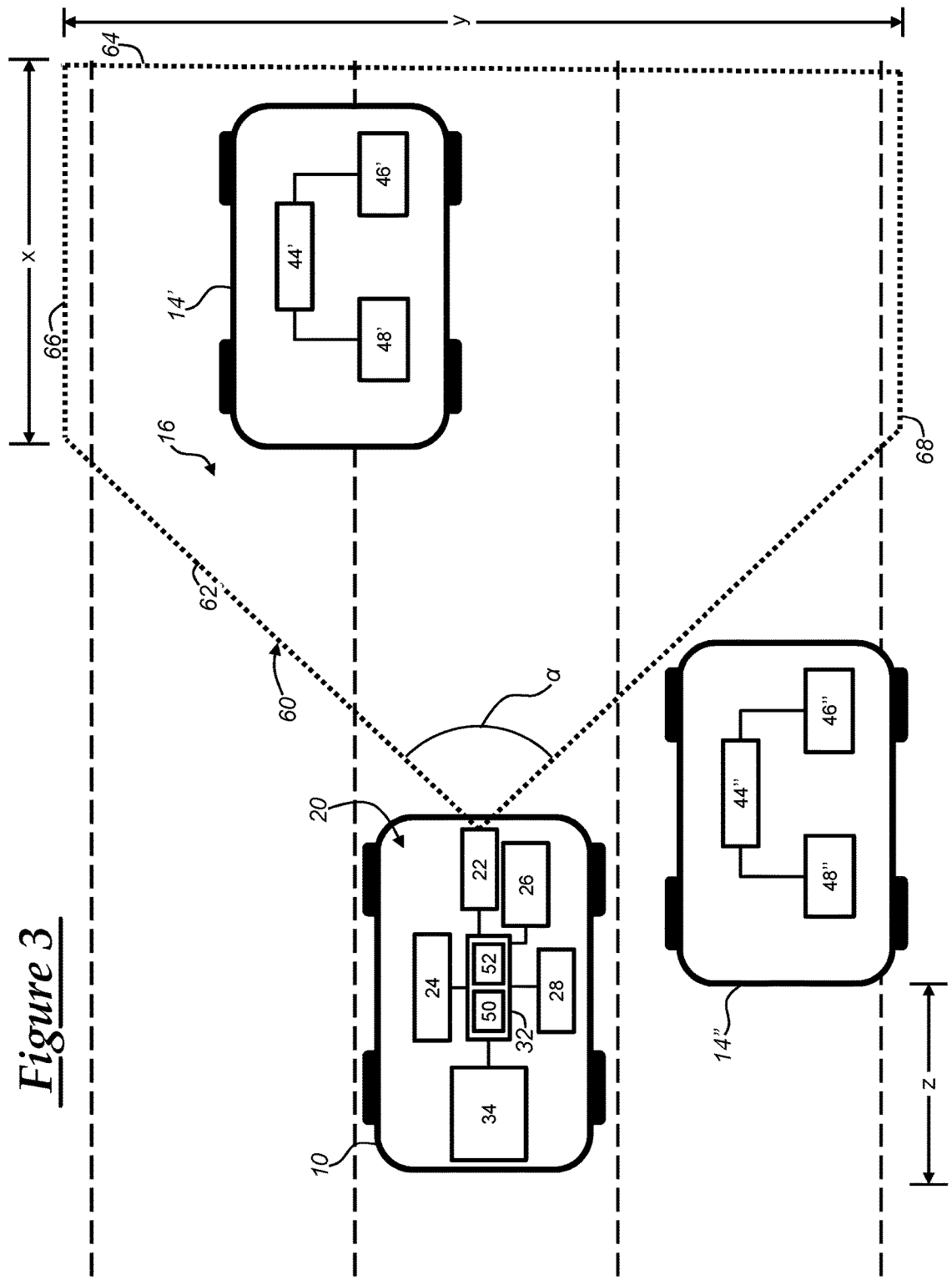
FIG. 3 is a schematic diagram of a host vehicle with an exemplary rear vision system and two trailing vehicles, one of which is within the field-of-view of a rear facing camera and one of which is not.
Figure 4:
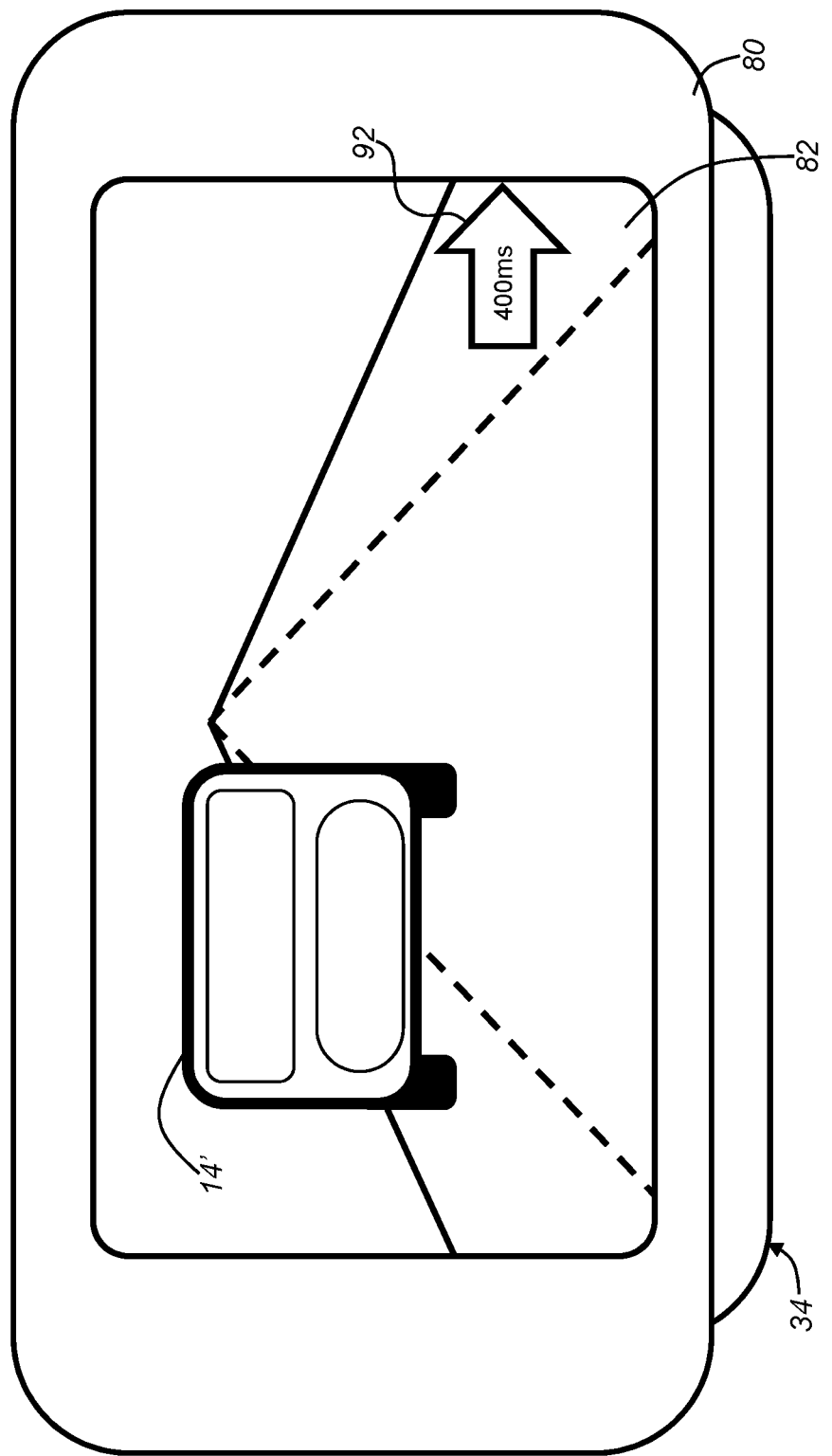
FIG. 4 is a schematic illustration of an exemplary electronic display mirror that may be used with the rear vision system of FIG. 3.

The preceding descriptions also apply to the components, devices, systems, embodiments, etc. that are shown throughout FIGS. 1-4, thus, duplicate descriptions have been omitted. For instance, the devices 44-48 in the remote vehicles 14 of FIGS. 1 and 3 may be similar to those with the same name that are already described above in conjunction with host vehicle 10. The same applies to the schematic representation of FIG. 3, which is generally the same as FIG. 1, except that remote vehicle 14" in FIG. 1 is located within the field-of-view 60 of camera 22 while remote vehicle 14" in FIG. 3 is located outside of it. With reference to FIGS. 2 and 4, the electronic display mirror 34 may be the same as the electronic display mirror described above. The schematic illustration in FIG. 2 generally corresponds to the situation illustrated in FIG. 1 in that the vehicle's 14' and 14" are displayed in a manner that corresponds to the relative locations shown in FIG. 1. The same is true for FIGS. 3 and 4; that is, the schematic illustration in FIG. 4 generally corresponds to the situation illustration in FIG. 3.

Figure 5:
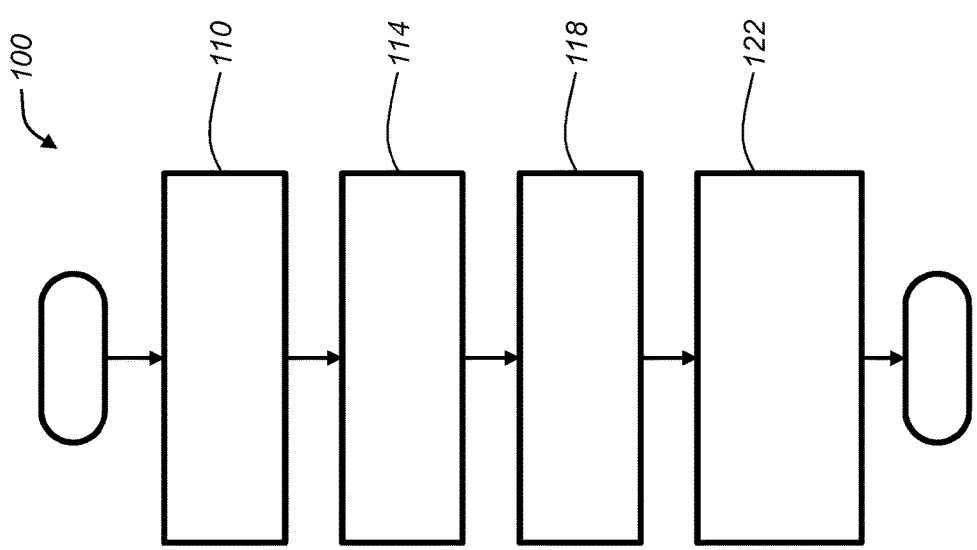
FIG. 5 is a flowchart of an exemplary method of initiating a vehicle system in anticipation of a performance driving event, such as a race.

Turning first to the flowchart of FIG. 5, there is shown an exemplary method 100 of initiating or setting up the rear vision system 20 in anticipation of a performance driving event, such as a race. This method may be carried wholly or partially by the rear vision system control unit 32 and its general purpose is to gather information about the participants of a race that includes the host vehicle, before the race begins. This way, during the race, the rear vision system 20 can display enhanced video on the electronic display mirror 34 that includes performance metrics for the other participating vehicles, while ignoring non-participants that may happen to be on the same racetrack. It should be appreciated that method 100 is simply an optional initiation or setup procedure that may be performed when the host vehicle is parked or when it is being driven; it is not mandatory that method 100 be used in conjunction with the other methods in FIGS. 6 and 7.

To begin, the initiation method receives some type of an indication that a new race will being, step 110. This indication may be received from one of a number of different devices or techniques. For example, step 110 may receive notification of a new race from a remote vehicle 14 via V2V system 16, from a separate computer that communicates with a telematics unit on the host vehicle 10, or from the driver himself or herself, to cite several possibilities. In an exemplary embodiment of step 110, the host vehicle driver indicates a new race by pressing a button, making a menu selection, speaking a voice command, etc. so that an initiation signal is sent from an input device to the control unit 32.

After notification of the new race has been received, the method obtains or gathers information about the racetrack, step 114. This step is optional, as racetrack information may not be available for all tracks or courses. Racetrack information may include geographical coordinates of waypoints, starting points, and/or ending points of the track. Additionally, or alternatively, racetrack information may indicate whether the track is contiguous, it may provide an ordered list of waypoints, topographical information, the number of laps, previous record times, previous average times, suggested apex speeds/velocities, guide information (such as the desired path when approaching a curve or turn), and/or other information pertaining to the racetrack. Other information, not directly pertaining to the racetrack, may also be obtained and combined with the racetrack information to provide more insight regarding the pending race. For example, weather information corresponding to the location of the host vehicle and/or the racetrack may be obtained used by the present method. According to one embodiment, step 114 obtains racetrack information from a remote computer via a telematics unit (not shown) and a cellular network, and the racetrack information is then provided form the telematics unit to the control unit 32.

Next, the method obtains or gathers information about the other participating vehicles (i.e., the other race participants or racers), step 118. This step may be carried out in several different ways. Step 118 could gather a list of participating vehicles from some sort of race coordinator or it could gather information from the other vehicles themselves. In an example of the latter case, step 118 receives basic safety messages (BSMs) from the different remote vehicles 14 at the V2V unit 24 and identifies other participating vehicles based on their locations, as indicated in the BSMs. Remote vehicles 14 that are located on a starting grid or a starting line, or within a certain distance of the host vehicle 10, for example, could be identified as participating vehicles or competing racers. The V2V unit 24 can convey this information to control unit 32 via traffic input or other signals.

Lastly, the method distinguishes participating vehicles from non-participating vehicles, step 122. One reason for doing this is so that during the race the superimposed performance metrics are only shown on the electronic display mirror 34 for race participants or fellow racers, and not for non-race participants, so as to not confuse or distract the host vehicle driver. "Distinguishing" can refer to filtering out remote vehicles not participating in the race or, alternatively, identifying remote vehicles that are participating in the race. In one embodiment of step 122, the V2V unit 24 and/or the control unit 32 generates a list of all participating vehicles, where the list includes a vehicle identifier (e.g., a security certificate authenticating the identity of the remote vehicle that sent the message) for each competing racer.

Once all of the participating vehicles or fellow racers have been identified, the optional method 100 ends.

Figure 6:
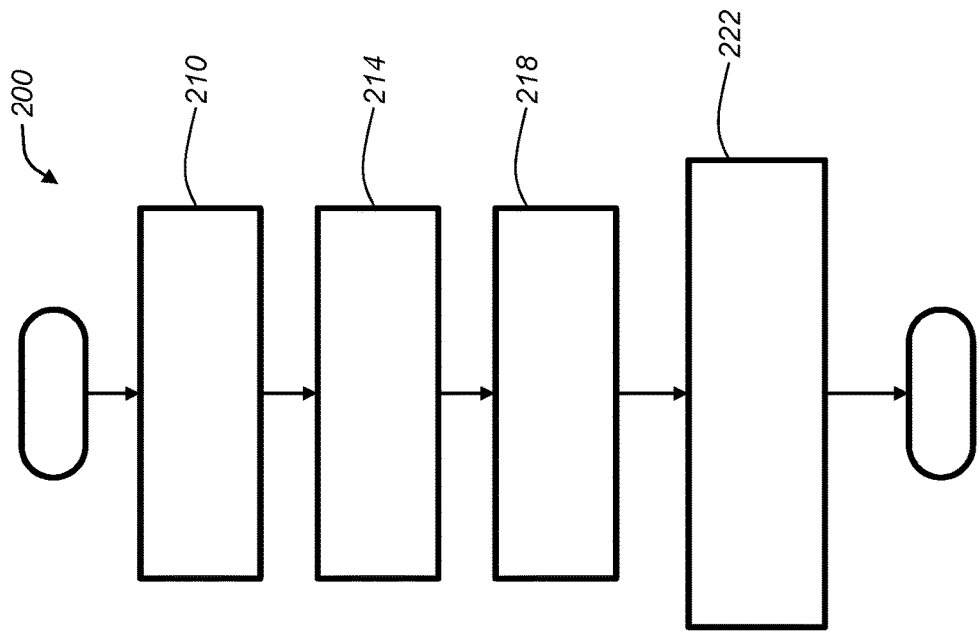
FIG. 6 is a flowchart of an exemplary method of determining an estimated time difference between a host vehicle and a trailing vehicle.

Referring now to FIG. 6, there is shown an exemplary method 200 of using a rear vision system, such as the system 20 shown and described above. The method provides enhanced video output to an electronic display mirror 34 so that a driver can view one or more performance metrics for a nearby vehicle added to video from the rear facing camera. In one example, the performance metric is a graphical and/or numerical indication of the relative separation (e.g., relative distance, relative time, etc.) between the host and trailing vehicles and it is superimposed over the real time video feed from the rear facing camera. In the following description, it is generally assumed that the race is already underway.

Beginning with step 210, the method identifies one or more remote vehicles that are within a certain proximity of the host vehicle and may do so in several different ways. For instance, step 210 may establish an area around the host vehicle 10 and then identify all of the remote vehicles 14 within that area or it may simply identify all remote vehicles within a certain distance of the host vehicle; these techniques could use GPS or other position coordinates from the host and remote vehicles to carry them out. In a different example, step 210 may identify all remote vehicles that are close enough in proximity to the host vehicle 10 that they can communicate over the V2V system 16; that is, it may rely on the V2V system to identify the nearby vehicles. According to a non-limiting embodiment, step 210 identifies all remote vehicles 14 that are in-range by receiving a basis safety message (BSM) from each remote vehicle at the V2V unit 24, at which point the V2V unit may process the information itself or it may pass this information along to the rear vision system control unit 32 in the form of a traffic input signal.

Next, the method establishes a list or matrix of trailing vehicles, step 214. As with the previous step, this step too may be performed in a number of different ways. In one example, step 214 first starts out with all of the remote vehicles 14 identified in the previous step 210 (i.e., nearby or in range vehicles), and then narrows down that group to a smaller list based on criteria such as which vehicles are following the host vehicle and/or which vehicles are fellow race participants (optional). Consider the non-limiting example where twelve remote vehicles 14 are nearby and are communicating with the host vehicle 10 via the V2V system 16 (identified in the previous step), seven of the twelve vehicles are trailing the host vehicle 10, five of the twelve vehicles are race participants, and only two of the twelve vehicles are both trailing vehicles and race participants. Step 214 can also narrow down the field by eliminating those vehicles that are not trailing vehicles, as defined above. In the current example, seven of the twelve remote vehicles are following the host vehicle and qualify as "trailing vehicles." Step 214 can further narrow down the group of twelve remote vehicles using other criteria, such as eliminating those not participating in the race or that are more than a certain number of laps behind the host vehicle (again, this is optional). Staying with the current example, this would leave only two vehicles 14', 14" that are nearby in proximity, that are trailing vehicles, and that are race participants, as illustrated in FIG. 1. The precise order or combination of sub-steps in 214 is not critical; the step may first narrow down according to race participants and then trailing vehicles, for example. In one embodiment, the V2V unit 24 provides traffic input to the control unit 32 that includes position or location data for each remote vehicle 14, the navigation unit 28 provides navigation input to the control unit 32 that indicates the current position of the host vehicle 10, and the control unit 32 uses already saved information pertaining to which vehicles are fellow race participants or other relevant information to help determine the list of trailing vehicles.

Numerous other criteria may also be used by the method to help develop a list of relevant trailing vehicles. For instance, saved information about the geographic layout of the current racetrack, information pertaining to the percentage of completion of the race for each vehicle in question, as compared completion percentage of the host vehicle could be used to determine which remote vehicles are of interest and, ultimately, should be given performance metrics displayed on the electronic display mirror 34. Nearby vehicles that have completed a significantly smaller percentage of the race, for example, may be eliminated as a vehicle of interest because they are so much further behind the host vehicle in laps, even though they may be rather close to the host vehicle in terms of physical proximity. Other examples are certainly possible.

In step 218, the method determines the closest trailing vehicle to the host vehicle. This determination may be based on a standard linear distance between each trailing vehicle and the host vehicle, or the determination may be based on a race track distance between each remote vehicle and the host vehicle. The "race track distance" takes into consideration the relative position of the host vehicle and a remote vehicle with respect to the race and, if the race is designed to have multiple laps, to the current lap of each of the vehicles. Put differently, the race track distance refers to a distance or to an amount of completion of a known race (e.g., a percentage of the overall race or an overall unit of length (meters, kilometers, number of laps, etc.)). For example, remote vehicle 14' in FIG. 1 may only be displaced by 8 meters from host vehicle 10; however, the remote vehicle may be an entire lap behind the host vehicle so that while the displacement is only 8 meters, the race track distance is one lap plus 8 meters (e.g., if the race track is 1000 meters, then the race track distance between vehicle 14' and host vehicle 10 is 1008 meters). These and other factors may be taken into account when the method determines which of the trailing or remote vehicles is closest to the host vehicle 10.

In any case, step 218 may be carried out at host vehicle 10 by receiving GPS coordinates of the nearby vehicle and then comparing these coordinates with the host vehicle's own GPS coordinates, using race track information or velocity information as a point of reference. Also, the vehicle may use information contained in BSMs to determine a race track or other distance between the two vehicles. For example, one or more of the nearby remote vehicles 14', 14" could provide the percentage of the race that they have completed to host vehicle 10, at which point the host vehicle may compare these distances to determine which vehicle is the closest. The closest trailing vehicle may be the vehicle whose distance is the least when compared to other trailing vehicles with respect to the host vehicle. As will be explained, one reason for determining or identifying the closest trailing vehicle is so the method can selectively provide performance metrics for only that vehicle and avoid cluttering the enhanced video output with performance metrics for a number of vehicles, as this could be confusing to the driver.

In step 222, the method calculates a performance metric for the closest trailing vehicle. In one embodiment, the performance metric is or represents an estimated time difference between the host vehicle 10 and the closest trailing vehicle, and may be calculated by dividing a distance (linear displacement and/or race track distance) by a vehicle speed (current host vehicle speed or trailing vehicle speed). Or, instead of a using a current vehicle speed, an imminent average remote vehicle speed may be used, wherein the imminent average remote vehicle speed is based on a set of measured speeds and/or accelerations of the nearby vehicle. The measured or estimated speeds of the nearby vehicle may be communicated to the host vehicle via a BSM. The calculation and/or estimation may be performed by the electronic processing device 52 in the rear vision system control unit 32, for example. This processing may recall previous vehicle speeds, accelerations, and/or other information that may be used in calculating the estimated time difference or some other performance metric. After the performance metric is determined, it may be displayed on the electronic display mirror 34 in the form of enhanced video output. FIG. 2 shows an exemplary embodiment where remote vehicle 14" is the closest trailing vehicle and a performance metric in the form of an estimated time difference (in this case, 1.3 seconds) is shown next to vehicle 14" so that the driver of the host vehicle knows that trailing vehicle 14" is the closest vehicle and is trailing the host vehicle by approximately 1.3 seconds. Other performance metrics, other than estimated time differences, could certainly be used; one such metric is an estimated distance difference (the display in FIG. 2 could show 12.5 meters instead of 1.3 seconds, for example).

Figure 7:
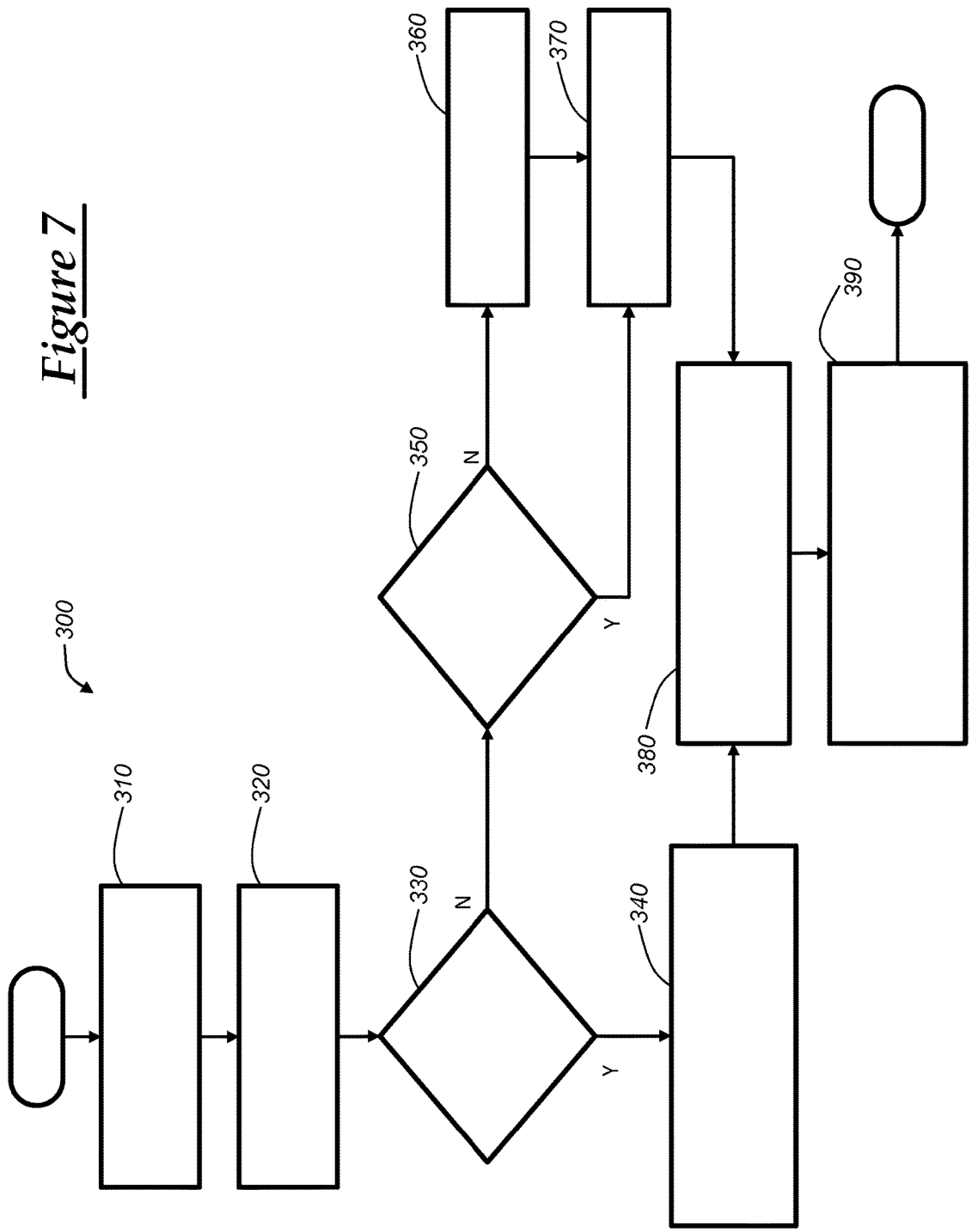
FIG. 7 is a flowchart of an exemplary method of displaying information relating to a trailing vehicle.

Referring now to FIG. 7, there is shown an embodiment 300 of a method of displaying enhanced video output having a performance metric for a trailing vehicle superimposed or otherwise added to video input from a rear-facing camera. In some embodiments, the performance metric may be displayed over or next to the image of the trailing vehicle in the video. In other embodiments, namely those wherein the trailing vehicle is not captured by the camera because it is out of the camera's field-of-view, the performance metric may be displayed with an indicator showing where the trailing vehicle is. The following description assumes that method 200 in FIG. 6 has not been performed and that method 300 is a separate process; it is possible for these processes to be used together, to be used independently, or to be used according to some other arrangement. Any combination of the following steps may be carried out at the camera 22, at the V2V unit 24, at the navigation unit 28, at the rear vision system control unit 32, at the electronic display mirror 34, or at some combination thereof.

Beginning with step 310, the method obtains video input or a video feed from a rear facing camera. For example, the video input may be obtained from rear facing camera 22 which is mounted on the anterior portion of the host vehicle 10 and is directed to the area behind the host vehicle. In another embodiment, the camera may be a side mounted and/or facing camera that, for example, captures video of the side of the host vehicle. This video input may capture video from one or more blind spots. In some embodiments, video from multiple cameras may be obtained, such as from the rear facing camera 22 and one or more side-mounted cameras or in a stereoscopic manner. The rear vision system control unit 32 obtains this video input and then, for example, may store, buffer, process and/or pass the video to the electronic display mirror 34, as will be described below.

In step 320, the method identifies the closest trailing vehicle. This step may not be necessary if method 200 has already been performed or otherwise carried out and a performance metric has already been calculated for the closest trailing vehicle. As described above, the closest trailing vehicle may be the remote vehicle 14 that is both a trailing vehicle and is the closest in proximity to the host vehicle 10 (closest in proximity may be based on standard linear distance or race track distance). Other factors, such as whether or not the remote vehicle is participating in the same race as the host vehicle, may also be considered during this step. In one embodiment, GPS coordinates for each of the remote vehicles are sent in basic safety messages (BSMs) to the V2V unit 24 on the host vehicle 10 over V2V system 16, and the V2V unit 24 then provides this coordinate information to the rear vision system control unit 32 in the form of traffic input. The control unit 32 uses the traffic input, in conjunction with navigation input from the navigation unit 28 on the host vehicle, to determine which remote vehicle is the closest trailing vehicle to the host vehicle. In FIGS. 1 and 3, for example, the closest trailing vehicle is vehicle 14".

Next, step 330 determines if the closest trailing vehicle is in the field-of-view of a camera. For example, in FIG. 1, vehicles 14' and 14" are both shown in the field-of-view 60 of rear facing camera 22; but in FIG. 3, only vehicle 14' is in the camera field-of-view. To determine if the closest trailing vehicle 14" is in the field-of-view 60 of camera 22, the method could use GPS coordinates of the closest trailing vehicle and/or the video output obtained from camera 22 in conjunction with the GPS coordinates of host vehicle 10. For example, the GPS coordinates in conjunction with the host vehicle's direction may be used corroboratively with the video input to locate and/or identify the closest trailing vehicle. The method may optionally use object recognition techniques to recognize one or more remote vehicles in the field-of-view 60. After recognizing one or more remote vehicles, the host vehicle may determine if one of the recognized vehicles from the video input is the closest trailing vehicle. For example, in the case shown in FIG. 1, the vehicle may recognize vehicles 14' and 14" and then use the GPS coordinates of the vehicles to determine which vehicle in the image is in fact vehicle 14". In the case of FIG. 3, the vehicle may recognize only vehicle 14', as it is the only vehicle shown in the field-of-view 60 of camera 22. Then, using the GPS coordinates of vehicle 14" (the closest trailing vehicle in the exemplary embodiment), the host vehicle may determine that vehicle 14" is out of the field-of-view of camera 22. If the closest trailing vehicle is out of the field-of-view, the method continues to step 350 (e.g., as is the case illustrated in FIG. 3); otherwise, the method continues to step 340 (e.g., as is the case illustrated in FIG. 1).

In step 340, the method determines the image location of the closest trailing vehicle so that it may be identified in the video input. Flashing forward to step 390, the enhanced video output will be displayed on, for example, the electronic display mirror 34. Since the closest trailing vehicle is in the camera field-of-view and, therefore, is captured in the video (see step 330), it may be desirable to highlight or otherwise indicate its presence in the video so that the driver can easier recognize it. Determining an image location will also be useful in subsequent steps when a performance metric will need to be positioned next to the closest trailing vehicle. One embodiment achieves this by using GPS coordinates of the host vehicle 10 and the closest trailing vehicle (e.g., vehicle 14" in FIG. 1) in conjunction with a video recognition algorithm. The comparison of the GPS coordinates informs the video recognition algorithm of where to look in the video input and what to look for in the video input (e.g., what parts of the vehicle are likely visible). In another embodiment, the method may use identifying information of the closest trailing vehicle (such as a participation number disposed over the hood of the vehicle or the color combination of the vehicle) to identify it.

In step 350, which takes place when the closest trailing vehicle is outside of the camera field-of-view, the method determines if the closest trailing vehicle is within a certain proximity of the host vehicle 10. In one embodiment, the proximity or distance may be a predetermined calibration distance (e.g., 5 m-20 m). For example, GPS coordinates may be used to determine the range or distance between the vehicles, as already explained, or the method may use radar or other sensors to detect the relative distance. For example, the distance may be calculated as the distance between the front of host vehicle 10 and the front of closest trailing vehicle 14", as shown in FIG. 3 as distance "z". After the relative distance between the vehicles is determined, it is compared to the predetermined distance or proximity, which could be a calibration distance.

In steps 360 and 370, it is assumed that the closest trailing vehicle is not in the field-of-view of the camera 22, as is the case with vehicle 14" in FIGS. 3 and 4. Because the closest trailing vehicle is not in the video input from camera 22, the location of the unseen vehicle 14" may be suggested by an arrow or other indicator 92 (see FIG. 4). The host vehicle 10 may be at risk of having its racing position "overtaken" by the closest trailing vehicle 14"; in this case, the method continues to step 360 wherein an "overtaking" indicator is set. If this is not the case, then the method continues to step 370.

In step 360, as previously mentioned, the host vehicle 10 is at risk of having its racing position "overtaken" by closest trailing vehicle 14". That being the case, the method may set a flag in memory 50 or in processing device 52 that indicates that when the video data is displayed, an "overtaking" indicator should be displayed. The method then continues to step 370.

In step 370, the method generates an indicator 92 that, when superimposed or overlaid on the video, will inform or otherwise indicate to the driver where the unseen vehicle 14" is located. In FIG. 3, the vehicle 14" is on the left side of the host vehicle 10 and is out of the field-of-view of camera 22. Therefore, this step may generate an arrow or other indicator 92 on the right side of the video (the orientation is the mirror image because the camera 22 and the driver are facing opposite directions) that can be overlaid or superimposed on the video data to indicate the position of vehicle 14". In the case where the race track contains changes in altitude (e.g., as may be the case where the race track is located in the mountains), then the indicator 92 could even be set to the top or bottom of the video depending on the relative location of the closest trailing vehicle. Alternatively, a precise pixel position may be set such that the indicator 92, when displayed, most accurately depicts where the unseen vehicle 14" is actually located. In any event, the method continues to step 380.

In step 380, the vehicle obtains or calculates a performance metric for the closest trailing vehicle. This metric may be an estimated time difference, as described in connection with method 200, or it could be some other type of performance metric like an estimated distance or range. In another embodiment, the performance metric may be calculated or otherwise determined by the remote vehicle 14, such as the closest trailing vehicle, and then transmitted to the host vehicle 10 via V2V system 16 or some other inter-vehicle communication system. Alternatively, the performance metric may be a vehicle speed, velocity, acceleration, lap number, distance, race position (e.g., first place out of eight), and may include other information, such as a vehicle identifier (e.g., a vehicle name, vehicle identifier number (VIN), race participation number), the name of a driver, or other vehicle information.

Finally, the enhanced video output, with the performance metric and/or the indicator graphically superimposed on the video, is provided to the electronic display mirror 34 for display, step 390. Some schematic and non-limiting examples of this type of enhance video output are shown in FIGS. 2 and 4. In the case where the closest trailing vehicle is in the field-of-view of the rear facing camera 22, the indicator 90 may be a circle, a change in coloration or brightness of the remote vehicle 14", or some other indicator that intuitively signifies which remote vehicle in the video is the closest trailing vehicle, as shown in FIG. 2. Alternatively, if the closest trailing vehicle is not in the camera field-of-view, the indicator 92 may be an arrow or other directional symbol that points to the out of screen location of the closest trailing vehicle, as shown in FIG. 4. Or, in the case where the vehicle is not in the field of view and the host vehicle is at risk of having its racing position being overtaken by the closest trailing vehicle (as determined, for example in step 350), then the indicator may simply be a warning on the appropriate side of the display (e.g., a yellow or red symbol indicating the eminent overtaking). In any event, the driver of the host vehicle 10 may now be informed of the closest trailing vehicle and its relative position along with a performance metric, such as an estimated time difference. It is, of course, possible for the enhanced video output to include performance metrics for multiple remote vehicles, as the method is not limited to providing such graphical information for one vehicle only.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for use with a rear vision system for a host vehicle, the rear vision system having a rear facing camera, a vehicle-to-vehicle (V2V) unit, and an electronic display mirror, and the method comprising the steps of:
   obtaining video input from the rear facing camera;
   obtaining traffic input from the V2V unit, the traffic input pertains to a remote vehicle;
   determining if the remote vehicle is in the field-of-view of the rear facing camera;
   determining whether the remote vehicle is a participating vehicle or a non-participating vehicle in a race involving the host vehicle based on information received from the remote vehicle;
   using the traffic input to determine a performance metric for the remote vehicle; and
   when it is determined that the remote vehicle is a participating vehicle in the race involving the host vehicle, displaying an enhanced video output on the electronic display mirror so that performance metrics for only participating vehicles are displayed on the electronic display mirror, wherein the enhanced video output includes the performance metric superimposed on the video input;
   wherein when the remote vehicle is in the field-of-view the displaying step displays the enhanced video output with the superimposed performance metric near an image of the remote vehicle, and when the remote vehicle is not in the field-of-view the displaying step displays the enhanced video output with the superimposed performance metric near an indicator that indicates the unseen location of the remote vehicle; and
   wherein when the remote vehicle is in the field-of-view of the rear facing camera, the displaying step displays the enhanced video output with the superimposed performance metric near the image of the remote vehicle and with an indicator in the form of an outline around the remote vehicle or a change in color or brightness of the remote vehicle that intuitively signifies that the remote vehicle in the video is the closest trailing vehicle.

2. The method of claim 1, further comprising the steps of:
   receiving an indication that the race has begun or will begin; and
   gathering information from the remote vehicle;
   wherein the determining step is based on the gathered information, and wherein the receiving, gathering, and determining steps are part of a method to initiate the rear vision system in anticipation of the race and are performed before the displaying step so that the displaying step only comprises displaying the enhanced video output for participating vehicles.

3. The method of claim 2, wherein the receiving step further comprises receiving an initiation signal at the vehicle-to-vehicle (V2V) unit or at a rear vision system control unit, the initiation signal indicates that the race is about to begin.

4. The method of claim 2, wherein the gathering step further comprises receiving a basic safety message (BSM) at the vehicle-to-vehicle (V2V) unit and gathering remote vehicle information from the BSM, the gathered remote vehicle information pertains to the location of the remote vehicle.

5. The method of claim 4, wherein the step of determining whether the remote vehicle is a participating vehicle or a non-participating vehicle in a race involving the host vehicle further comprises determining whether the remote vehicle is a participating vehicle or a non-participating vehicle based on a location of the remote vehicle relative to the host vehicle or to a designated race starting area.

6. The method of claim 2, further comprising the step of:
generating a list of all participating vehicles in the race after the step of determining whether the remote vehicle is a participating vehicle or a non-participating vehicle in a race involving the host vehicle, the list includes a security certificate for each participating vehicle that acts as a vehicle identifier in a vehicle-to-vehicle (V2V) communication system.

7. The method of claim 2, further comprising the step of:
gathering racetrack information about a racetrack where the race will be held, the gathered racetrack information includes geographic data on the racetrack.

8. The method of claim 1, further comprising the step of:
determining if the remote vehicle is also a trailing vehicle before the displaying step, the trailing vehicle has a front-most point that is located behind a front-most point of the host vehicle, relative to the direction of host vehicle travel; and
the displaying step only displays the enhanced video output with the superimposed performance metric when the remote vehicle is a trailing vehicle.

9. The method of claim 8, wherein the step of determining if the remote vehicle is also a trailing vehicle further comprises determining if the remote vehicle is a trailing vehicle and is within the certain proximity of the host vehicle; and
the displaying step only displays the enhanced video output with the superimposed performance metric when the remote vehicle is a trailing vehicle and is within the certain proximity of the host vehicle.

10. The method of claim 9, wherein the step of determining if the remote vehicle is also a trailing vehicle further comprises determining if the remote vehicle is a trailing vehicle, is within the certain proximity of the host vehicle, and is participating in a same race as the host vehicle; and
the displaying step only displays the enhanced video output with the superimposed performance metric when the remote vehicle is a trailing vehicle, is within the certain proximity of the host vehicle, and is participating in the same race as the host vehicle.

11. The method of claim 10, wherein the step of determining if the remote vehicle is also a trailing vehicle further comprises determining if the remote vehicle is a trailing vehicle, is within the certain proximity of the host vehicle, is participating in the same race as the host vehicle, and is a closest trailing vehicle to the host vehicle; and
the displaying step only displays the enhanced video output with the superimposed performance metric when the remote vehicle is a trailing vehicle, is within the certain proximity of the host vehicle, is participating in the same race as the host vehicle, and is the closest trailing vehicle to the host vehicle.

12. The method of claim 1, further comprising the step of:
determining if the remote vehicle is also a closest trailing vehicle before the displaying step, the closest trailing vehicle is a trailing vehicle that is closest to the host vehicle in terms of either a standard linear distance or a racetrack distance; and
the displaying step only displays the enhanced video output with the superimposed performance metric when the remote vehicle is the closest trailing vehicle.

13. The method of claim 1, wherein the using step further comprises using the traffic input to determine the performance metric in the form of an estimated time difference between the host vehicle and the remote vehicle, and the displaying step further comprises displaying the enhanced video output on the electronic display mirror, wherein the enhanced video output includes the estimated time difference superimposed on the video input.

14. The method of claim 1, wherein when the remote vehicle is not in the field-of-view of the rear facing camera, the displaying step displays the enhanced video output with the superimposed performance metric near an arrow that indicates on which side of the electronic display mirror the unseen remote vehicle is located.

15. The method of claim 1, further comprising the step of:
monitoring a plurality of remote vehicles via a vehicle-to-vehicle (V2V) system and maintaining a list of the remote vehicles that are also participating in a same race as the host vehicle.

* * * * *